April 19, 1966  F. WINKLER  3,246,944
FADING STRUCTURE FOR MOTION PICTURE CAMERAS
Filed Nov. 25, 1963  3 Sheets-Sheet 1

Fig.1

INVENTOR.
FRIEDRICH WINKLER
BY
Michael J. Striker

April 19, 1966  F. WINKLER  3,246,944

FADING STRUCTURE FOR MOTION PICTURE CAMERAS

Filed Nov. 25, 1963  3 Sheets-Sheet 2

*INVENTOR.*
FRIEDRICH WINKLER

BY

*Michael J. Striker*

April 19, 1966   F. WINKLER   3,246,944
FADING STRUCTURE FOR MOTION PICTURE CAMERAS
Filed Nov. 25, 1963   3 Sheets-Sheet 3

Fig.9

INVENTOR.
FRIEDRICH WINKLER
BY
Michael J. Striker

United States Patent Office 3,246,944
Patented Apr. 19, 1966

3,246,944
FADING STRUCTURE FOR MOTION PICTURE CAMERAS
Friedrich Winkler, Munich, Germany, assignor to Agfa Aktiengesellschaft, Leverkusen, Germany
Filed Nov. 25, 1963, Ser. No. 325,820
Claims priority, application Germany, Nov. 27, 1962, A 41,711
25 Claims. (Cl. 352—91)

The present invention relates to motion picture cameras.

In particular, the present invention relates to the fading of scenes which are photographed.

As is well known, when photographing different scenes with a motion picture camera, it is desired at the end of a given scene to operate the camera in such a way that each scene gradually fades out, and also when starting the photographing of a new scene it is, of course, desirable to gradually fade the new scene in. Various structures are already known for providing fade-in and fade-out, and it is a primary object of the present invention to improve the fading structure of motion picture cameras.

Thus, it is one of the objects of the present invention to provide a motion picture camera with a fading structure which makes it possible to carry out the fading operations independently of any particular length of film so that, for example, the fading operations can be carried out in a predetermined time interval rather than along a predetermined length of film. The independence of the fading operations from a parameter such as film length is of great advantage particularly when fading operations are carried out at a different speeds of film movement.

Another object of the present invention is to provide a fading structure which can have its speed of operation regulated so that the operator can select one of a plurality of different speeds at which the fading operations will be carried out.

Yet another object of the present invention is to provide a fading assembly which, while completely independent of the remainder of the camera structure, such as the drive for the film, nevertheless is capable of being selectively coupled to a structure, such as the film drive, for simultaneous operation of the film driving structure and fading structure.

Still another object of the present invention is to provide a fading apparatus which, while being automatically operable, can at the same time be manually operated.

Also, it is an object of the present invention to provide a fading apparatus which at the will of the operator can not only be manually operated, but can also be used to place one or more filters in an operative position intersected by the optical axis.

Furthermore, it is an object of the present invention to provide a fading apparatus which can be selectively placed in a plurality of different operating positions for effecting only a fade-in, only a fade-out, or a fade-out which is followed by a fade-in after a length of film equal to that used for the fade-out has been rewound, or in a position where a fade-in follows a fade-out either directly or with a length of film located between the fade-out and the fade-in.

It is furthermore an object of the present invention to provide a fading apparatus which can be set by the operator in a position ready for operation and which can carry out a series of fading operations at different film portions without requiring resetting of the fading apparatus.

It is furthermore an object of the present invention to provide a fading apparatus which is simple and compact and very reliable in operation and which can have all of its controls arranged substantially independently of the remainder of the camera structure.

With the above objects in view the invention includes, in a motion picture camera, a first drive means which drives the camera during normal operation thereof, and a fading means for effecting a plurality of fading operations. In accordance with the present invention a second drive means which is independent of the first drive means is operatively connected to the fading means to drive the latter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
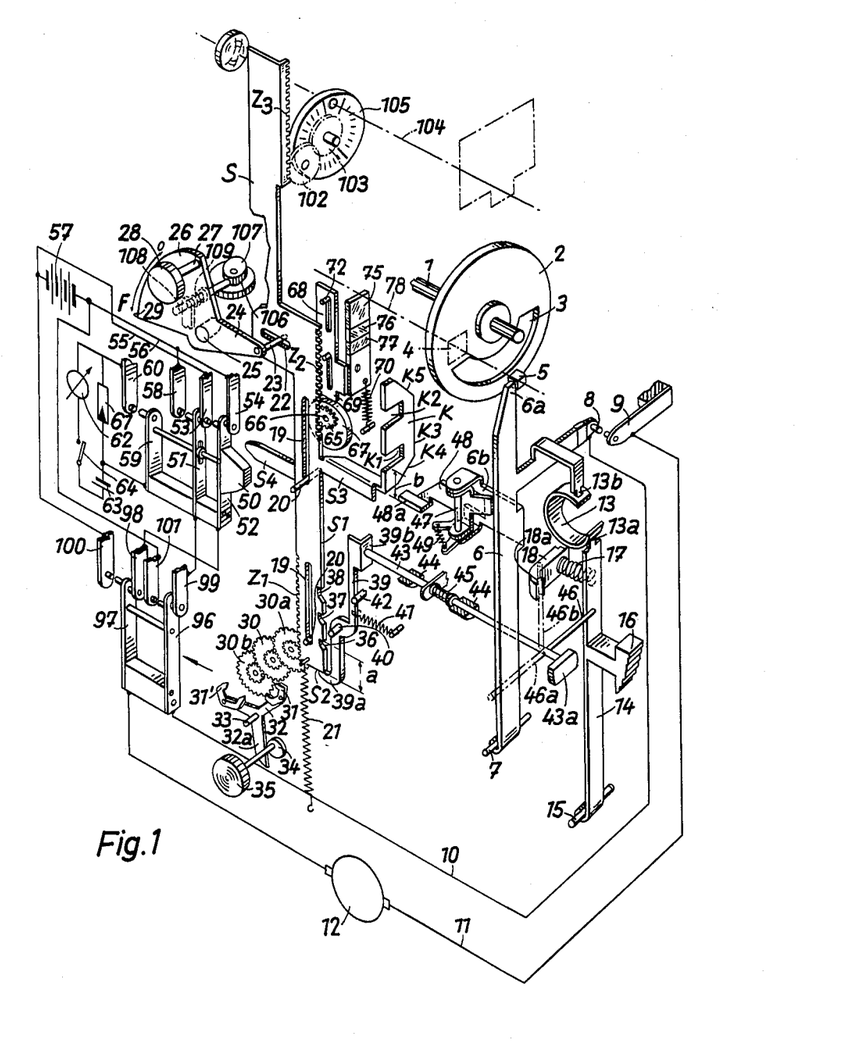
FIG. 1 is a schematic exploded perspective illustration of the essential components of one possible embodiment of a structure according to the present invention.

Referring to FIG. 1, there is shown therein part of a rotary shaft 1 which fixedly carries the shutter disc 2 which is formed with an arcuate aperture 3 through which light can pass through the aperture 4 through which the optical axis passes, so that the film will be exposed in a well known manner when light can reach the aperture 4 through the arcuate cutout 3 of the shutter disc 2. Adjacent to its periphery the disc 2 fixedly carries a stop member 5 which cooperates with the free end 6a of a lever 6 which is pivotally supported by a stationary pin 7. A projection of the lever 6 carries an electrical contact 8 which is insulated from the lever 6 and which moves, when the level 6 turns away from the stop member 5, into engagement with a contact 9 for closing the circuit of a drive means 12 in the form of an electric motor which is operatively connected to a suitable transmission for carrying out the normal operations of the camera, such as the transportation of the film and the rotation of the shaft 1. The contacts 8 and 9 are respectively connected electrically through the leads 10 and 11 into the circuit of the motor 12. An arcuate leaf spring 13 is connected at 13b to the lever 6 and at 13a to a manually operable lever 14 which forms part of a manually operable means for starting and stopping the camera and, in particular, for starting and stopping the motor 12. The lever 14 is pivotally supported by a stationary pin 15 and carries a finger-piece 16 which is accessible to the operator.

A spring 17 is compressed between a stationary member 18 and the lever 14 for urging the latter in a counterclockwise direction, as viewed in FIG. 1, to the illustrated rest position where the camera is not operating. When the operator pushes the finger-piece 16 the turning of the lever 14 in opposition to the spring 17 will act in a known way on the spring 13 to turn the lever 6 in a clockwise direction, as viewed in FIG. 1, to displace the end 6a thereof away from the stop member 5 and to displace the contact 8 into engagement with the contact 9 so that the motor 12 is energized simultaneously with the release of the shutter 2 by movement of the lever 6 away from the stop member 5. Upon release of the finger-piece 16 the spring 17 will return the lever 14 to its rest position and the spring 13 will now act to turn the lever 6 back to the illustrated position where its end 6a is in the path of turning of the stop member 5 to engage the latter and stop the return of the shutter. Unillustrated stop members, which are not shown for the sake of clarity, cooperate with the levers 6 and 14 to limit the extent of turning thereof.

The fading means of the invention includes an elongated control slide S which is guided for vertical movement by way of a plurality of elongated vertical slots 19 formed in the control slide and stationary pins 20 which extend through the slots 19 so as to cooperate therewith to guide the slide S for vertical movement. A second drive means, which is completely independent of the camera drive means 12, is operatively connected to the fading means to drive the latter, and this second drive means in the illustrated example takes the form of an elongated coil spring 21 connected at its top end to the bottom end of the slide S and connected at its bottom end to a stationary part of the camera so that the tensioned coil spring 21 forms a drive means which seeks to drive the slide S downwardly, as viewed in FIG. 1. The slide S is formed with a horizontal slot 22 which receives a pin 23 which is fixed to a lever 24 which is supported for turning movement about a horizontal axis by a pin 25 which is fixed to the lever 24 and supported for rotary movement by any suitable stationary bearing. The lever 24 has a sector-shaped plate portion 26 fixedly carrying a pin 27 to which a knob 28 is fixed, and this knob 28 is accessible to the operator so that the operator can turn the lever 24 in a counterclockwise direction, as viewed in FIG. 1, to the illustrated position for tensioning the spring 21. The plate 26 carries an index 29 cooperating with suitable indicia to indicate to the operator the position of the fading means. In the position of the parts illustrated in FIG. 1 the index 29 is aligned with a symbol F indicating that the fading apparatus is ready for operation. When the index 29 is aligned with symbol O, the operator knows that the fading apparatus has run down and it is necessary to again return the lever 24 to the position shown in FIG. 1 in order to tension the drive spring 21 so that the fading means will again be ready for operation. Thus, when the operator engages the knob 28 to turn the lever 24 in a counterclockwise direction to the illustrated position the slide S will be raised and the spring 21 will be tensioned.

The slide S has a toothed portion Z1 which forms a rack which meshes with a turnable pinion coaxial to a larger gear 30a, and these elements form part of a retarding assembly similar to the retarding structure used for self-timers in photographic devices. The retarding assembly 30 includes an unillustrated known slip clutch which permits the retarding assembly to move during raising of the slide S and tensioning of the spring 21 in opposition to a relatively small force. The train of gears which forms the retarding assembly 30 terminates in an escapement wheel 30b which is shown in FIG. 1 as engaged by a double-toothed anchor 31 which also forms part of the retarding assembly. The anchor 31 is pivotally carried by an arm of a lever 32 which has three arms. Another of the arms of the lever 32 carries a second anchor 31' which has a mass different from the anchor 31, an arm 32a of the lever 32, which is supported for turning by a stationary pin 33, is maintained by an unillustrated spring in engagement with the periphery of a cam 34 fixedly carried by a rotary shaft which extends to the exterior of the camera where this shaft fixedly carries a knob 35 so that by turning the knob 35 the operator can turn the cam 34 to displace the lever 32 between the illustrated position and a position where the anchor 31' engages the escapement wheel 30b. Since the anchor 31' has a mass greater than the anchor 31, the extent to which the driving of the slide S by the spring 21 will be retarded will be greater when the anchor 31' engages the escapement wheel 30b than when the anchor 31 engages the wheel 30b, so that in this way the elements 32–35 form a manually operable selecting means for selecting a particular speed of operation of the fading means. The speed of operation of the fading means will, of course, be determined by the spring 21 and the retarding means 30, and this speed will, of course, be slower when the anchor 31' engages the escapement wheel 30b than when the anchor 31 engages the escapement wheel. The knob 35 may carry an index cooperating with suitable indicia at the exterior of the camera for indicating to the operator the selected speed of operation of the fading means.

The slide S has a surface portion, formed by its edge SI, which is formed with notches 36, 37, 38. These notches are spaced from each other by a distance a, and the lowermost notch 36 is also spaced from the lower edge S2 of the slide S by the same distance a.

A manually operable means is available to the operator and is operatively connected to the fading means to release the latter to the drive means 21, 30 to be driven thereby and to automatically terminate the operation of the fading means if a given fading operation has been completed, and this manually operable means includes a pawl 39 supported for turning movement by a stationary pivot pin 40 and having a tooth 39a at its bottom end engaging the bottom edge S2, in the position of the parts illustrated in FIG. 1, to prevent the slide S from being driven downwardly by the tensioned spring 21. A spring 41 is connected at one end to a stationary part of the camera and at its opposite end to the pawl 39 to urge the latter to the illustrated position where it engages a stationary stop pin 42. At its upper end portion the pawl 39 has an integral extension 39b which is engaged by an end of an elongated rod 43 which also forms part of this manually operable means. Stationary bearings 44 support the rod 43 for axial and angular movement, and a spring 45 is coiled about the rod 43, engages at its left end, as viewed in FIG. 1, a stationary member formed with an opening through which the rod 43 freely passes, and at its right end, as viewed in FIG. 1, a collar which is fixed to the rod 43, so that in this way the spring 45 urges the rod 43 to the right, as viewed in FIG. 1, to the illustrated position where the collar engages an end of the right bearing 44 illustrated in FIG. 1. The rod 43 carries at its free end, which is distant from the pawl 39, a finger-piece 43a which is elongated so that the operator can perceive the angular position of the finger-piece 43a and thus of the rod 43. It is apparent that when the operator pushes on the finger-piece 43a the pawl 39 will be turned in opposition to the spring 41 in a direction displacing the tooth 39a away from the lower edge S2 of the slide S so as to release the latter to the drive means 21, 30, and even if the operator then immediately releases the finger-piece 43a the drive will not be interrupted since the tooth 39a will only engage the surface SI so that the latter will slide downwardly along the tooth 39a, and in this way the fading operation will continue until the notch 36 reaches the tooth 39a which will then automatically enter the notch to stop the operation of the fading means, and it will be noted that during this time the slide S has moved downwardly through the distance a. The operator can at any time thereafter again actuate the finger-piece 43a so as to displace the tooth 39a from the notch 36, and the slide S will again be advanced downwardly through the distance a to be automatically stopped when the notch 37 reaches the tooth 39a. Thus, it will be seen that the parts 39–45 form a manually operable means for releasing the fading means to the drive means 21, 30 and for automatically stopping the driving of the fading means when a given fading operation has been completed. Of course, when the tooth 39a is in the notch 37 it is possible for the operator to again actuate the finger-piece 43a, and the slide S will again be advanced through the distance a until the notch 38 receives the tooth 39a. At this time the index 29 will be aligned with the symbol O and the operator will note that it is necessary to return the index 29 to the symbol F in order for the fading means to be again set for operation. It will be noted that the lower ends of the notches 36–38 are downwardly inclined so that the slide S is free to move upwardly past the tooth 39a which has a bottom curved edge cooperating with the lower inclined edges of the notches 36–38 to free the slide S for upward movement while interrupting the downward movement thereof by cooperation of the upper horizontal edge of the tooth 39a with the upper horizontal edges of the notches 36–38, respectively.

The manually operable means 14 for starting and stopping the operation of the camera and the manually operable means 39–45 for actuating the fading means are capable of being coupled to each other by a coupling means which in the illustrated example takes the form of an elongated pin 46 fixed to and extending perpendicularly from the rod 43 and capable of being placed either in the solid-line position shown in the figure or in the dot-dash positions 46a and 46b. Thus, the axial movement of the rod 43 will produce turning of the pawl 39 in opposition to the spring 41 while angular movement of the rod 43 will position the coupling pin 46, and because of the elongated configuration of the finger-piece 43a the operator will note the angular position of the coupling pin 46. In the position illustrated in FIG. 1 this coupling pin 46 overlaps the front face of the lever 14 so that when the operator pushes the finger-piece 43a to the left in opposition to the spring 45 the lever 14 will also be turned in opposition to the spring 17, and thus the drive means 12 will be energized simultaneously with the release of the fading means to its independent drive means 21, 30. When the finger-piece 43a is turned through 180° from the illustrated position the pin 46 will be located in the position 46a behind the lever 6 (to the left thereof as viewed in FIG. 1), and thus in this position actuation of the finger-piece 43a will not produce simultaneous actuation of the lever 14. In addition, the rod 43 can be turned so as to locate the pin 46 in the position 46b where it is located in front of and in engagement with the stationary member 18 which is also engaged by the spring 17, and in this position the manually operable means 39–45 is, of course, locked against operation so that the operator cannot release the fading means. The member 18 may be formed with a recess 18a for receiving the pin 46 when it is in the position 46b. Thus, in this latter position of the manually operable means 39–45 the camera is set to prevent accidental unintentional release of the fading means.

As has been indicated above, both the motor 12 for driving the camera and the spring 21 can be simultaneously set into operation for providing simultaneous operation of the camera and the fading means through their separate drives 12, 21, 30, respectively, and in addition a control means is provided for preventing the drive 12 from terminating the operation of the camera until a given increment prior to the time when the tooth of the pawl 39 is received in the notch 36. This control means takes the form of a plate K which is carried by an extension S3 of the slide S, the slide S together with its component or extension S3 and the plate K all being formed integrally from a single sheet of metal, for example. The plate K is formed with a pair of cutouts K1 and K2, and in addition it will be noted that it has a vertical right edge portion K3 located between a pair of oppositely inclined edge portions K4 and K5. The distance between the lower edge of the cutout K1 and the bottom surface of a portion 48a of the manually operable means for starting and stopping the drive means 12 is indicated at b, and this distance b is somewhat smaller than the distance a. In the manner which has been described above movement of the rod 43 to the left in opposition to the spring 45 will of course serve to release the slide S so that it will be advanced downwardly by the spring 21, and when the rod 43 is released the tooth 39a will simply engage the edge S1 which slides along the tooth 39a.

As may be seen from FIG. 1 the lever 6 has an extension 6b which is provided with a pair of ears carrying a pin 47 on which a rocker 48 is mounted for swinging movement, and a spring 49 is connected at one end to the rocker 48 and at its other end to part of the extension 6b for urging the rocker 48 in a direction which places its right end, as viewed in FIG. 1, against the extension 6b. This rocker 48 has the portion 48a of the manually operable means for actuating the drive means 12.

When the lever 14 is moved inwardly simultaneously with the movement of the rod 43 to the left, as viewed in FIG. 1, the lever 6 will of course turn in a clockwise direction, as viewed in FIG. 1, in the manner described above, and upon release of element 43a, assuming that the coupling pin 46 is in the position shown in solid lines in FIG. 1, the springs 17 and 13 will seek to return the lever 6 to the position where its end 6a will be in the path of turning of the projection 5, but at this time due to the downward movement of the slide S the control means K will be in the path of movement of the portion 48a to prevent the lever 6 from reaching the position where its end 6a is in the path of turning of the projection 5, and thus even though the pair of manually operable means are both released nevertheless the drive means 12 will remain energized and the spring 21 will continue to advance the slide S downwardly. The lever 6 will be free to be returned by the springs 17 and 13 to the position where it will stop the turning of the shutter 2 when the cutout K1 reaches the portion 48a so that the latter can enter into the cutout K1 and now the camera drive 12 will stop. However, since the distance b is less than the distance a the slide S will continue to move downwardly since the upper edge of the notch 36 has not yet reached the upper edge of the tooth 39a, the slide S continuing to move downwardly by a distance equal to the difference between the distances a and b.

The height of the cutout K1 is equal to the thickness of the portion 48a plus the difference between a and b, so that during the continued downward movement of the slide S the upper edge of the cutout K1 does not engage the portion 48a of the rocker 48.

The above operations are repeated when the rod 43 is again shifted to the left, as viewed in FIG. 1, so as to move the tooth 39a out of the notch 36 so that it will engage the surface S1 until the notch 37 receives the tooth 39a. During this second actuation the front face of the plate K at its portion between the cutouts K1 and K2 will engage the free end of the portion 48a to prevent the lever 6 from reaching its rest position where it will stop the operation of the drive 12 and the rotation of the shutter 2, and this operation will continue until the cutout K2 reaches the portion 48a which will then enter into the cutout K2. This will occur after the slide S has again moved downwardly by a distance b while the slide S will continue to move downwardly until completing the greater distance a required for the tooth 39a to be received in the notch 37, and finally a third actuation is possible in the same way at which time the top edge of the plate K will move past the portion 48a after a third displacement through the distance b while the slide S will continue to move downwardly for a third time through the distance a until the tooth 39a is received in the notch 38. As was indicated above after three such operations it will be necessary for the operator to actuate the knob 28 in order to again reset the structure to the position shown in FIG. 1.

The top edge of the plate K which moves beyond the portion 48a during the third actuation described above is formed by the inclined edge portion K5. Therefore, when the operator engages the knob 28 to return the lever 24 to the position shown in FIG. 1, the slide S will move upwardly, and at this time the inclined edge K5 will engage the portion 48a and will return the rocker 48 in opposition to the spring 49, without disturbing the position of the lever 6, and during the continued upward movement of the slide S the edge K3 will move along the portion 48a subsequently to the edge K5, and finally the edge K4 will move along the portion 48a after which the rocker 48 will be returned by the spring 49 to the position illustrated in FIG. 1. In this position the rocker is beneath the edge portion K4. Therefore, if the rod 43 is turned through 180° to place the coupling pin 46 in the position 46a, and the rod 43 is depressed by the operator in opposition to the spring 45, the slide S will of course be released to the spring 21 to be driven downwardly thereby, but the lever 6 will remain in the position illustrated in FIG. 1 preventing energizing of the motor 12 and release of the shutter 2, and at this time the edge portion K4 will engage the portion 48a to again turn the rocker 48 in opposition to the spring 49, and during the continued downward movement of the slide S the edge portion K3 and finally the edge portion K5 will move along the portion 48a of the rocker 48, so that in this way it is indeed possible to provide actuation of the fading means independently of the drive means 12 and the shutter 2.

The motor 12 is reversible, and in a manner known in the art when it is reversed it will rewind film in the camera. Reversing means is provided for reversing the direction of operation of the motor 12, and this reversing means takes the form of a switch assembly which is located in the circuit of the motor 12. The slide S of the fading means has an extension S4 formed integrally therewith, and a projection 50 is located in the path of downward movement of this projection S4 which of course moves downwardly with the slide S. The projection 50 is fixed to and extends from a switch member 52 which is coupled with a switch member 51 for movement simultaneously with the latter, and these springy switch contacts 51 and 52 normally engage the pair of spring contacts 53 and 54 which are connected through the conductors 55 and 56, respectively, to the battery 57 which is in the circuit of the motor 12, so that when the contacts 51 and 52 engage the contacts 53 and 54, respectively, and the contact 8 engages the contact 9 as described above, the motor 12 will be driven in the direction which advances the film so as to expose the latter in the normal way. However, when the extension S4 engages the projection 50 the springy contact 51 is displaced into engagement with a contact 58 which is connected with the contact 54 in the manner shown in FIG. 1, while the contact 52 now engages the contact 53, so that the motor 12 will be reversed in this way. The extension S4 is displaced from the projection 50 by a distance substantailly equal to the distance b, so that the reversal of the motor 12 takes place while the slide S continues to move after having moved initially through the distance b. In other words, when the portion 48a is received in the cutout K1 the motor 12 will be reversed and until the tooth 39a is received in the notch 36 so as to terminate the downward movement of the slide S the motor 12 is set for reversed motion, which motion will not actually take place until the switch 8, 9 is actuated again by manually depressing the fingerpiece 43a and thereby turning the lever 6 in a clockwise direction in the manner described above.

The camera includes a diaphragm-control means capable of automatically setting the diaphragm according to the lighting conditions, in a manner well known in the art, and this diaphragm control means includes the galvanometer 62 shown diagrammatically in FIG. 1 which is connected in a manner which is well known in the art and which is not illustrated to the diaphragm so as to set the latter according to the lighting conditions. In the illustrated example the galvanometer 62 is connected into a circuit which includes the battery 63 and a switch 64 for closing the circuit of the galvanometer, and in addition the circuit includes a photosensitive resistor 61 which responds to the light intensity for determining the position of the galvanometer and thus of the diaphragm in a manner well known in the art.

In accordance with the present invention there is also located in the circuit of the galvanometer 62 a switch formed by the springy contacts 59 and 60, and the contact 59 is coupled with the contact 51 to be displaced with the latter when the extension S4 engages the projection 50. Thus, whenever the switch assembly is actuated by the extension S4 to reverse the direction of rotation of the motor 12, the contact 59 will engage the contact 60 to close the switch 59, 60, and it will be noted that this switch is in parallel with the photosensitive resistor 61 so that the latter will be automatically short-circuited during the time when the reversing means reverses the motor 12. As a result of the short-circuiting of the photosensitive resistor 61, the diaphragm which is operatively connected to the galvanometer 62 to be positioned thereby is automatically closed so as to prevent light from reaching the film, and in this way a light-blocking means is provided to prevent light from reaching the film, and this light-blocking means is automatically actuated whenever the motor 12 is reversed for winding the film. Of course, a protective resistor can be provided so as to limit the magnitude of the current which can flow through the galvanometer, so that in this way the galvanometer will not have a current of great magnitude passing therethrough.

The slide S is also provided with teeth Z2 which form a rack meshing with a pinion 65 which is fixedly carried by a rotary shaft 66 supported for rotation by any suitable stationary bearings, and a cam 67 is fixed to the pinion 65 for rotary movement therewith. A carrier 68 has a bottom end 69 engaging the periphery of the cam 67, and the carrier 68 is formed with elongated vertical slots 71 receiving pins 72, as shown more clearly in FIG. 2, so that in this way the carrier 68 can be displaced downwardly until the top ends of the slots 71 respectively engage the stationary pins 72. These pins 72 are carried by a stationary plate 73 shown in FIG. 2, and between the plate 73 and the carrier 68 the pins 72 have a larger diameter than the diameter of the portions thereof which pass through the slots 71, respectively, so that in this way the approach of the carrier 68 to the stationary plate 73 is limited by the portions of the pins 72 which are of larger diameter. On the other hand, the carrier 68 is free to move away from the plate 73 along the portions of the pins 72 which are of smaller diameter and which pass through the slots 71. A pair of coil springs 74 are coiled about the pins 72 at the side of the carrier 68 which is not visible in FIG. 2, and these coil springs engage collars which are fixed to the free ends of the pins 72 which are distant from the plate 73, so that these springs 74 urge the plate 68 toward the plate 73 until this plate or carrier 68 engages the portions of the pins 72 which are of larger diameter. The carrier 68 carries, in the manner shown most clearly in FIG. 2, a plurality of filters 75–77, the filter 75 being a fading filter in the form of a gray wedge filter while the filter 76 may be a skylight filter and the filter 77 may be a color correcting filter used for exposing film intended to be used out of doors indoors under artificial light. A spring 70 (FIG. 1) is connected at its bottom end to a stationary member and at its top end to the carrier 68 for urging the latter downwardly so that in this way when the carrier 68 is displaced upwardly by the cam 67 the spring 70 will maintain the bottom end 69 of the carrier 68 in engagement with the periphery of the cam 67.

The configuration of the cam 67 is such that during a first downward movement of the slide S through a portion of the distance a the cam 67 continuously raises the carrier 68 in opposition to the spring 70 and advances the gray wedge filter 75 across the optical axis 78 to an increasing extent so that by the time the slide S has moved through the distance a the gray wedge filter 75 will intersect the optical axis with a portion which is so dark that no more light will be able to reach the film. Likewise during the rewinding of the film when the slide S continues to move downwardly, the cam 67 has a circular portion of constant radius engaging the carrier 68 so that the latter is not vertically displaced during rewinding of the film and thus the darkest portion of the gray wedge filter is maintained at the optical axis during rewinding of the film so that in this way also undesirable exposure of the film during rewinding thereof is prevented. When the slide S has moved through the distance *a* for the second time so that the tooth 39*a* engages the upper edge of the notch 37, the cam 67 has in engagement with the carrier 68 a peripheral portion which enables the latter to be retracted by the spring 70 back to its starting position. Of course, structures other than those described above may be used to prevent light from reaching the film during rewinding thereof. The filter 75 should be arranged as close as possible to the plane in which the diaphragm of the objective is located.

Figure 2:
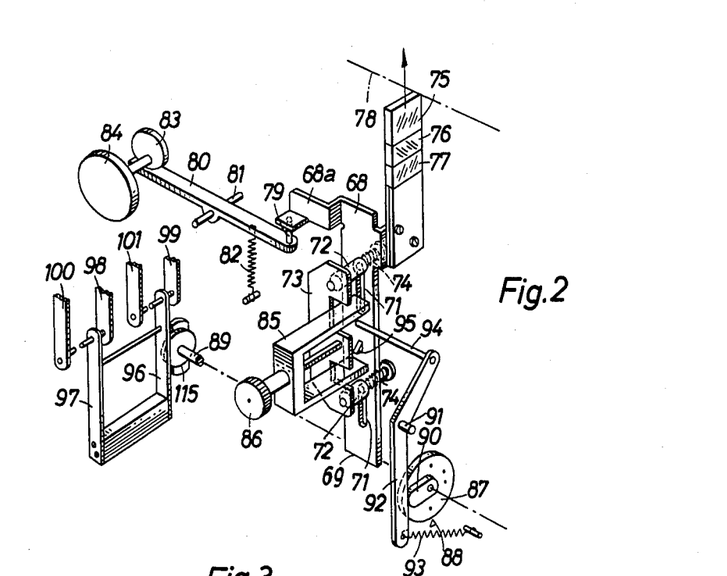
FIG. 2 is a schematic exploded perspective illustration of a structure for controlling filters one of which forms part of the fading apparatus of the invention.

A manually operable means is provided to make it possible to manually actuate the fading filter 75 so that manual fading can be carried out whenever desired, and this manually operable means is also used in order to place the filter 76 or 77 in their operative positions respectively intersecting the optical axis 78. Thus, referring to FIG. 2, it will be seen that the carrier 68 has an integral extension 68*a* which has a horizontal portion which fixedly carries a downwardly directed pin 79 which is located over the free end of a lever 80 which is supported for turning movement by a stationary pin 81 and which is urged in a clockwise direction, as viewed in FIG. 2, by the spring 82. The left end of the lever 80, as viewed in FIG. 2, is maintained by the spring 82 in engagement with a cam 83 which is fixed to a rotary shaft supported by any suitable stationary bearing, and the end of the shaft which is distant from the cam 83 fixedly carries a knob 84 which is accessible to the operator so that by turning the knob 84 the operator can displace the carrier 68 manually and thus place any of the filters 75–77 at the option of the operator in alignment with the optical axis 78. Thus, when the operator turns the knob 84 through an initial range from a given starting position shown in FIG. 2 the fading operations described above can be carried out manually, while when the knob 84 is turned beyond this initial range the lever 80 can be turned through an additional angle so as to first locate the filter 76 and then the filter 77 in alignment with the optical axis, and any suitable indicia may cooperate with an index carried by the knob 84 for indicating to the operator how the filters 75–77 are positioned in accordance with the angular position of the knob 84.

Of course, filters other than those specifically referred to above may be carried by the carrier means 68, and for the purpose of blocking light by way of the diaphragm it is possible to use an iris diaphragm, or a slotted diaphragm, or a comb-type of diaphragm having wedge-shaped portions which have alternating transparent and opaque portions. Also, it is possible to use for the diaphragm a pair of pivotally connected diaphragm blades formed with suitable overlapping notches which in accordance with the positions of these blades determine the size of the aperture in a manner well known in the art.

The stationary plate 73 supports for sliding movement in a direction normal to the plate 73 a substantially U-shaped member 85 which extends horizontally in the manner shown in FIG. 2 and which fixedly carries a knob 86 accessible to the operator, and at any time during the fading operation after the carrier 68 has been displaced from its starting position by the cam 67, the operator can push the knob 86 so as to displace the member 85 to the right, as viewed in FIG. 2, and in this way the free ends of member 85 will engage the carrier 68 and shift it along the pins 72 in opposition to the springs 74, thus displacing the bottom end of the carrier 68 normal to the plane of the cam 67 beyond the latter, and as soon as the bottom end of the carrier 68 moves beyond the periphery of the cam 67 the spring 70 will immediately return the carrier 68 to its starting position determined by the engagement of the top ends of the slots 71 with the portions of the pins 72 which are of smaller diameter, as described above. Thus, in this way the carrier 68 will be displaced downwardly alongside of the cam 67. Thus, with this construction it is possible for the operator at any time to terminate the fading operation simply by pushing on the knob 86. Any suitable structure is provided to maintain the knob 86 and the member 85 therewith in sliding engagement with the plate 73 while still providing for the member 85 the necessary amount of movement for shifting the carrier 68 laterally beyond the cam 67 to be displaced downwardly alongside of the latter in the manner described above. In the starting position of the cam 67 its periphery is displaced slightly beneath the bottom end of the carrier 68, so that when the cam 67 again reaches its starting positions the springs 74 will automatically return the carrier 68 to its position in the plane of the cam 67 to be engaged by the camming periphery thereof.

The structure of the invention also includes a manually operable selecting means for selecting one of a plurality of different types of fading operations, and this manually operable selecting means is shown in FIG. 2 as being formed by a manually turnable selecting disc or knob 87 having indicia which cooperate with a stationary index 88 of the camera, these indicia indicating different types of fading operations, as described below in connection with FIGS. 4–8. The rotary selecting member 87 is fixedly carried by a rotary shaft 89 supported for turning movement by any suitable stationary bearings, and this shaft also fixedly carries a cam 90 which engages a lever 92 supported for turning movement by a stationary pin 91, a spring 93 urging the lever 92 in a counterclockwise direction, as viewed in FIG. 2, so as to maintain the lever 92 in engagement with the cam 90 which is of course constrained to turn simultaneously with the selecting disc or knob 87. The lever 92 fixedly carries an elongated pin 94 which is adapted to cooperate with a projection 95 fixed to the carrier 68. When the disc 87 is set at an angular position indicating to the operator that the apparatus is set for fading out of a scene, the pin 94 is positioned in the path of upward movement of the projection 95. As the carrier 68 is displaced upwardly by the turning cam 67 the projection 95 will approach the pin 94 and upon engaging the latter will automatically produce displacement of the carrier 68 which can also be produced manually by the knob 86 in the manner described above, so that in this way also it is possible to automatically displace the carrier 68 normally to the plane of the cam 67 so that the spring 70 will return the carrier 68 to its starting position and thus the fading operation will be automatically terminated in this way.

Figure 4:
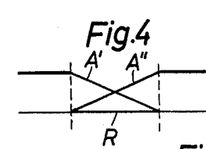
FIGS. 4–8 are respectively diagrams of different types of fading operations which can be effected with the structure of the invention.
Figure 5:
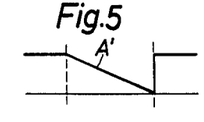

In the diagram of FIG. 5 as well as in the diagrams of FIGS. 4 and 6–8, the abscissa indicates film length while the ordinate indicates light value or the reciprocal of the magnitude of a filter value, in such a way that substantially no light reaches the film at the intersection of the abscissa and ordinate while increasing amounts of light reach the film at points along the ordinate which are progressively displaced upwardly from the abscissa. Thus, FIG. 5 shows a fade-out operation. The film is exposed in the normal way along the heavy line which extends horizontally from the upper left end of FIG. 5, and when the vertical dotted line is reached a fade-out operation commences and continues along the line A′ until fade-out is completed and light no longer reaches the film, the line A′ intersecting the abscissa at this moment, and it will be noted that the line then extends vertically from the abscissa back to the original light value indicating that the carrier 68 has, for example, been displaced from the cam 67 and immediately returned by the spring 70 to its starting position, by cooperation of the pin 94 with the projection 95 when the disc 87 has been placed by the operator in a fade-out position the operation of which is shown diagrammatically in FIG. 5.

If the operator places the disc 87 in a position indicating fading which includes both fade-out, rewinding of the film, and then fade-in, then the cam 90 displaces the lever 92 to a position where the pin 94 is out of the path of movement of the projection 95 and the operations take place in the manner described above where the film is rewound after a fade-out has been completed upon movement of the slide S from the point where the tooth 39a engages the notch 36 to the point where notch 37 is engaged. This operation is indicated in FIG. 4 where it will be seen that at the end of the line A', there is rewinding indicated by the horizontal line R and then fade-in indicated by the line A'', this fade-in taking place during forward movement of the film over the same portion thereof which received the fade-out exposures. The rewinding provided by downward movement of the slide S to complete the distance a is sufficient to rewind the length of film precisely equal to that which received the fading-out exposures.

Figure 7:
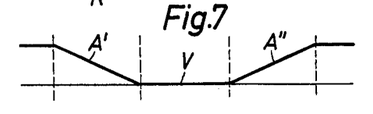
Figure 8:
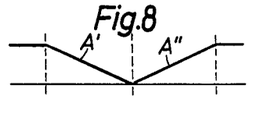
Figure 9:
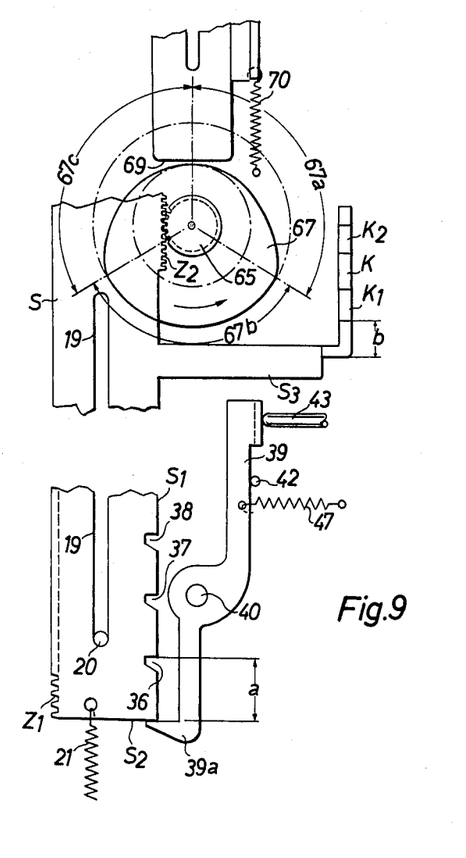
FIG. 9 illustrates in a side view the construction and operation of a cam of the structure of the invention.

It is also possible to locate the selector disc 87 in an angular position which will provide a fade-out and a fade-in but without rewinding of the film, and in this latter position also the pin 94 is located out of the path of movement of the projection 95 by the cam 90. In this position a cam 115 which is carried by the shaft 89 engages the coupled springy switch members 96 and 97 which normally are connected with the spring contacts 51 and 52 by engaging the contacts 98 and 99 which are electrically connected with the contacts 51 and 52 in the manner shown in FIG. 1, so that in this way the circuit to the motor 12 is completed. However, when the cam 115 displaces the contacts 96 and 97 away from the contacts 99 and 98, respectively, they will engage, instead, the contacts 101 and 100, respectively, which are directly connected to the battery 57 in the manner shown in FIG. 1 so as to render the reversing of the motor 12 which would otherwise be provided by the switch means 50–58 ineffective. Therefore, at the end of a fade-out operation the film is not rewound but instead is fed forwardly by an increment equal to the length which would have been rewound, as shown in FIG. 7 where the length V is equal to the length R of FIG. 4. Thereafter a fade-in A'' is provided. The portion V can be removed from the film and the film can then be spliced together, and of course it is also possible to cut out any of the portions A' and A'' when editing the film, so that in this way it is possible to provide in the final film less than a complete darkening of the scene. If instead of using the contacts 101 which continue the driving of the motor 12 in the forward direction for continuing the advance of the film as shown in FIG. 7, these contacts are simply eliminated, then the circuit of the motor 12 will simply be opened when the cam 115 displaces the contacts 97 and 96 from the contacts 99 and 98, respectively, as described above, and for this purpose it is only necessary to break the engagement between one pair of switch contacts. Such a construction will result in the operation shown in FIG. 8 where the fade-in A'' directly follows the fade-out A' without an intervening portion as shown in FIG. 7.

Figure 6:
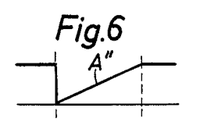

The diagram of FIG. 6 which includes only a fade-in A'' can be provided when the fading means is set into operation after the manually operable means 39–45 has been placed in the position where the coupling pin 46 assumes the position 46a. At this time movement of the rod 43 to the left, as viewed in FIG. 1, will release the slide S but will not displace the lever 6 away from the stop 5, as described above, and the slide S is allowed to continue to operate until the beginning of the fade-in operation whereupon the operator depresses the finger-piece 16 to start the motor 12 or the rod 43 has in the meantime been turned back to the position where the coupling pin 46 will actuate the lever 14 simultaneously with the turning of the lever 39. This latter type of operation can of course also be provided through a suitable setting of the selecting member 87 which also can be supported for axial as well as angular movement and can be connected to a rod which will perform the same operations as the rod 43.

As is indicated at the upper portion of FIG. 1, the slide S is also provided with an elongated toothed portion Z3 which forms a rack meshing with a pinion 102 which turns a gear 103 which is supported for rotary movement and which is coaxially fixed with an indicating disc 105 which can be transparent and can have suitable graduations imprinted thereon and which is located in the optical axis 104 of the viewfinder of the camera, as shown diagrammatically in FIG. 1. Thus, the vertical displacement of the slide S will result in rotation of the indicating means 105 and the angular position of the latter will always be indicative of the vertical position of the side S so that the graduations carried by the indicating means 105 and visible to the operator in the viewfinder will indicate to the operator the condition of the fading means. This indicating means is particularly useful to indicate to the operator when to press on the knob 86 for terminating the fade-out so as to provide the operation shown in FIG. 5, as well as the moment when to start the operation of the camera to provide the fade-in of FIG. 6.

The structure of the invention also includes a lock means which provides a releasable lock for preventing a change in the number of frames exposed per second during operation of the fading means, and in addition the lock means of FIG. 1, which is described below, will prevent operation of the fading means unless the camera is set for a given number of frames per second. As may be seen from FIG. 1 a manually operable speed-selection means 106 is available to the operator for selecting the number of frames which will be exposed per second during operation of the camera, and this structure is well known in the art and operates in a well known manner to control the speed with which the film is advanced so that the selected number of film frames will be exposed per second. The rotary selector 106 fixedly carries a cam 107 which turns therewith, and a lock pin 108 is guided for longitudinal movement in a direction perpendicular to the plate 26 and a spring 109 is operatively connected with the pin 108 to urge the latter toward the cam 107 so as to maintain the end of the pin 108 at all times in engagement with the periphery of the cam 107. The width of the plate 26 is so great that the pin 108 can only move through the plane which is occupied by the plate 26 in the two end positions of the lever 24. Otherwise the plate 26 is situated in the path of movement of the pin 108 and prevents the latter from being shifted through the plane occupied by the plate 26, so that at this time the pin 108 extends between the plate 26 and the cam 107 with the ends of the pin 108 located directly next to the plate 26 and of course engaging the cam 107. The pin 108 will be situated in this position between the plate 26 and the cam 107 when a predetermined frequency of film-frame exposure is selected, such as, for example, 16 frames per second. Thus, during operation of the fading means it is not possible to change the selected frequency of exposure. On the other hand, if the selected frequency of exposure differs from the predetermined one where the pin is situated between the plate 26 and the cam 107, such as 16 frames per second in the above example, then the pin 108 will be in the path of turning movement of the lever 24 and will prevent operation of the fading means.

Figure 3:
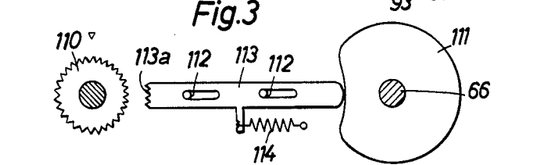
FIG. 3 illustrates a locking structure for locking the structure which changes the speed of movement of the film during operation of the fading apparatus.

Another embodiment of a lock means is shown in FIG. 3. In this case the rotary structure for selecting the frequency with which the film frames will be exposed includes a toothed wheel 110 which is fixed to the shaft of the selector to turn therewith. The shaft 66 which carries the cam 67 also carries a cam 111 which is in the same plane as the wheel 110, and an elongated bar 113 is formed with elongated slots which receive stationary guide pins 112 so that the bar 113 can shift horizontally, as viewed in FIG. 3. A spring 114 urges the bar 113 to the right, as viewed in FIG. 3, so as to maintain the curved right end of the bar 113 of FIG. 3 in engagement with the periphery of the cam 111. The other end of the bar 113 is toothed as shown at 113a, and this toothed end 113a is adapted to cooperate with the wheel 110. Whenever the shaft 66 is angularly displaced from its starting position the cam 111 will shift the bar 113 in opposition to the spring 114 into engagement with the wheel 110 to lock the frequency selecting structure against operation, so that with the embodiment of FIG. 3 while it is possible to carry out fading operations at any selected frequency of frame exposure, nevertheless it is not possible to change the selection during operation of the fading means.

The invention has been described above in connection with a purely schematic example which of course can be changed in many ways. For example, instead of a slide S it is possible to use a single shaft on which various control elements are mounted. Instead of an electric motor it is possible to provide a spring motor with suitable clutches for taking the drive therefrom. Also, it is possible to indicate in the viewfinder the position of the diaphragm elements independently of the position of the fading means, and the fading means itself may be driven by an electric motor or may be driven through a suitable drive in a stepwise manner. Also, in order to rewind the film it is possible to use a reversible claw arrangement or to use a pair of interchangeable claws which alternately operate to advance the film in opposite directions. Where an electric drive is used for the fading means structure can be provided to open the circuit so as to cut off the fading means from its source of voltage in the intermediate positions of the fading means.

Where the fading means is driven in a stepwise manner, an electromagnetic drive may be used. Furthermore, instead of a purely mechanical retarding mechanism it is also possible to use a pneumatic or hydraulic retarding structure. Also, where the fading means is electrically driven the lock means instead of being mechanical can be constructed so as to interrupt the circuit of the drive or the circuit for the drive can be bridged in a well known manner.

Moreover, instead of providing the structure for coupling the pair of manually operable means for the fading means and the camera driving structure on the structure which controls the fading means, by way of the coupling pin 46 which is attached to the rod 43, as described above, it is possible instead to connect the coupling structure to the manually operable means for starting and stopping the drive of the camera and to transmit operation of this latter manually operable means to the manually operable means which releases the fading means. For example, it is possible to transmit movement of the manually operable means which controls the camera to the manually operable means which controls the fading means by way of spring which enables the structure for releasing the fading means to be locked against operation when it is desired to operate the camera without fading.

It will be understood that each of the elements described above, or two or more together, may also find a useful application in other types of cameras differing from the types described above.

While the invention has been illustrated and described as embodied in fading devices for motion picture cameras, it is not intended to be limited to the details shown, since various modifications and structural changes may be made without departing in any way from the spirit of the present invention.

What is claimed as new and desired to be secured by Letters Patent is:

1. In a motion picture camera, in combination, first drive means for driving the camera during normal operation thereof; fading means for effecting a plurality of fading operations; spring means operatively connected to said fading means for driving the latter; and retarding means operatively connected to said fading means for retarding the driving thereof by said spring means so as to control the speed with which said fading means is driven by said spring means, said retarding means including a rotary escapement wheel, a pair of anchors of different masses, respectively, and means operatively connected to said pair of anchors for selectively placing one or the other of said anchors in operative engagement with said escapement wheel for controlling the extent to which said retarding means retards the drive of said spring means, whereby the fading means will be driven at different speeds depending upon the selected anchor which is placed in engagement with said escapement wheel.

2. In a motion picture camera, in combination, first drive means for driving the camera during normal operation thereof; fading means for effecting a plurality of fading operations; second drive means independent of said first drive means and operatively connected to said fading means for driving the latter; and manually operable means operatively connected to said fading means for releasing the latter to said second drive means to be driven thereby and for automatically terminating the operation of said fading means by said second drive means when a given fading operation has been completed, said manually operable means including a pawl engaging a portion of said fading means to prevent operation thereof by said second drive means until said pawl is moved away from said portion of said fading means, said fading means having an elongated surface portion formed with a notch and said manually operable means including a spring which urges said pawl against said surface portion of said fading means after release of the latter to said second drive means, and said fading means while being driven by said second drive means being moved in a direction which advances said notch toward said pawl until the latter enters into said notch for automatically stopping the operation of said fading means.

3. In a motion picture camera, in combination, first drive means for driving the camera during normal operation thereof; fading means for effecting a plurality of fading operations; second drive means independent of said first drive means operatively connected to said fading means for driving the latter; first manually operable means operatively connected to said first drive means for controlling the latter to start and stop the operation of the camera; and second manually operable means operatively connected to said fading means for releasing the latter at the will of the operator to said second drive means to start the operation of said fading means and for automatically terminating the operation of said fading means after a given fading operation has been completed, one of said manually operable means being adjustable between a position where it is coupled to the other of said manually operable means for also operating the latter and a position where it is not coupled to said other manually operable means so as to be operable independently thereof.

4. In a motion picture camera, in combination, first drive means for driving the camera during normal operation thereof; fading means for effecting a plurality of fading operations; second drive means independent of said first drive means operatively connected to said fading means for driving the latter; first manually operable means operatively connected to said first drive means for controlling the latter to start and stop the operation of the camera; and second manually operable means operatively connected to said fading means for releasing the latter at the will of the operator to said second drive means to start the operation of said fading means and for automatically terminating the operation of said fading means after a given fading operation has been completed, one of said manually operable means being adjustable between a position where it is coupled to the other of said manually operable means for also operating the latter and a positon where it is not coupled to said other manually operable means so as to be operable independently thereof, said second manually operable means being supported for axial and angular movement and being axially movable for releasing said fading means for operation and angularly movable between said positions in one of which said second manually operable means engages said first manually operable means for operating the latter simultaneously with said second manually operable means.

5. In a motion picture camera, in combination, first drive means for driving the camera during normal operation thereof; first manually operable means operatively connected to said first drive means for actuating the latter to operate the camera; fading means for effecting a plurality of fading operations; second drive means independent of said first drive means operatively connected to said fading means for driving the latter; second manually operable means operatively connected to said fading means for releasing the latter to said second drive means to operate said fading means and for automatically terminating the operation of said fading means by said second drive means after a given fading operation has been completed; and control means carried by said fading means for movement therewith and coacting with said first manually operable means for preventing the latter from assuming a position which stops the operation of said first drive means until said fading means has at least approximately approached the end of the given operation where it is automatically stopped by said second manually operable means.

6. In a motion picture camera, in combination, first drive means for driving the camera during normal operation thereof; first manually operable means operatively connected to said first drive means for actuating the latter to operate the camera; fading means for effecting a plurality of fading operations; second drive means independent of said first drive means operatively connected to said fading means for driving the latter; second manually operable means operatively connected to said fading means for releasing the latter to said second drive means to operate said fading means and for automatically terminating the operation of said fading means by said second drive means after a given fading operation has been completed; and control means carried by said fading means for movement therewith and coacting with said first manually operable means for preventing the latter from assuming a position which stops the operation of said first drive means until said fading means has at least approximately approached the end of the given operation where it is automatically stopped by said second manually operable means, said control means including a plate movable with said fading means and formed with a cutout and said first manually operable means having a portion which tends to move through the plane occupied by said plate for stopping the operation of said first drive means, said plate by engaging said portion of said first manually operable means preventing the latter from reaching a position where the operation of said first drive means will be terminated and while said fading means continues to operate, said plate moving in a direction which advances said cutout thereof toward said portion of said first manually operable means until said cutout reaches said portion so that the latter can enter into said cutout and thus stop the operation of said first drive means.

7. In a motion picture camera, in combination, first drive means for driving the camera during normal operation thereof; first manually operable means operatively connected to said first drive means for actuating the latter to operate the camera; fading means for effecting a plurality of fading operations; second drive means independent of said first drive means operatively connected to said fading means for driving the latter; second manually operable means operatively connected to said fading means for releasing the latter to said second drive means to operate said fading means and for automatically terminating the operation of said fading means by said second drive means after a given fading operation has been completed; and control means carried by said fading means for movement therewith and coacting with said first manually operable means for preventing the latter from assuming a position which stops the operation of said first drive means until said fading means has at least approximately approached the end of the given operation where it is automatically stopped by said second manually operable means, said control means including a plate movable with said fading means and formed with a cutout and said first manually operable means having a portion which tends to move through the plane occupied by said plate for stopping the operation of said first drive means, said plate by engaging said portion of said first manually operable means preventing the latter from reaching a position where the operation of said first drive means will be terminated and while said fading means continues to operate, said plate moving in a direction which advances said cutout thereof toward said portion of said first manually operable means until said cutout reaches said portion so that the latter can enter into said cutout and thus stop the operation of said first drive means, said portion of said first manually operable means being in the form of a spring-pressed rocker and said plate having at least one inclined edge portion for engaging said rocker and turning the latter relative to the remainder of said first manually operable means during movement of said fading means relative to said first manually operable means so that when said edge portion engages said rocker, said first manually operable means will not be influenced to set said first drive means into operation.

8. In a motion picture camera, in combination, first drive means for driving the camera during normal operation thereof; first manually operable means operatively connected to said first drive means for actuating the latter to operate the camera; fading means for effecting a plurality of fading operations; second drive means independent of said first drive means operatively connected to said fading means for driving the latter; second manually operable means operatively connected to said fading means for releasing the latter to said second drive means to operate said fading means and for automatically terminating the operation of said fading means by said second drive means after a given fading operation has been completed; and control means carried by said fading means for movement therewith and coacting with said first manually operable means for preventing the latter from assuming a position which stops the operation of said first drive means until said fading means has at least approximately approached the end of the given operation where it is automatically stopped by said second manually operable means, said control means including a plate movable with said fading means and formed with a cutout and said first manually operable means having a portion which tends to move through the plane occupied by said plate for stopping the operation of said first drive means, said plate by engaging said portion of said first manually operable means preventing the latter from reaching a position where the operation of said first drive means will be terminated and while said fading means continues to operate, said plate moving in a direction which advances said cutout thereof toward said portion of said first manually operable means until said cutout reaches said portion so that the latter can enter into said cutout and thus stop the operation of said first drive means, said portion of said first manually operable means being in the form of a spring-pressed rocker and said plate having at least one inclined edge portion for engaging said rocker and turning the latter relative to the remainder of said first manually operable means during movement of said fading means relative to said first manually operable means so that when said edge portion engages said rocker, said first manually operable means will not be influenced to set said first drive means into operation, said plate having an intermediate side edge portion and a pair of end edge portions inclined with respect to said intermediate edge portion and one of which forms said edge portion cooperating with said rocker, whereby both of said inclined edge portions and said intermediate edge portion will cooperate with said rocker to bring about movement of said fading means without influencing said first manually operable means.

9. In a motion picture camera, in combination, first drive means for driving the camera during normal operation thereof; first manually operable means operatively connected to said first drive means for actuating the latter to operate the camera; fading means for effecting a plurality of fading operations; second drive means independent of said first drive means operatively connected to said fading means for driving the latter; second manually operable means operatively connected to said fading means for releasing the latter to said second drive means to operate said fading means and for automatically terminating the operation of said fading means by said second drive means after a given fading operation has been completed; and control means carried by said fading means for movement therewith and coacting with said first manually operable means for preventing the latter from assuming a position which stops the operation of said first drive means and for releasing said first manually operable means for movement to said position which stops the operation of said first drive means when said fading means has approached the end of said given operation by a predetermined increment so that after said first drive means has stopped operating, said fading means will continue to operate until the end of the given operation where it is automatically stopped by said second manually operable means.

10. In a motion picture camera, in combination, first drive means for driving the camera during normal operation thereof; fading means for effecting a plurality of fading operations; second drive means independent of said first drive means and operatively connected to said fading means for driving the latter; manually operable means operatively connected to said fading means for releasing the latter to said second drive means to be driven thereby and for automatically terminating the operation of said fading means by said second drive means when a given fading operation has been completed; and reversing means operatively connected to said first drive means for reversing the latter so as to rewind film in the camera, said fading means actuating said reversing means while carrying out said given fading operation.

11. In a motion picture camera, in combination, first drive means for driving the camera during normal operation thereof; first manually operable means operatively connected to said first drive means for actuating the latter to operate the camera; fading means for effecting a plurality of fading operations; second drive means independent of said first drive means operatively connected to said fading means for driving the latter; second manually operable means operatively connected to said fading means for releasing the latter to said second drive means to operate said fading means and for automatically terminating the operation of said fading means by said second drive means after a given fading operation has been completed; control means carried by said fading means for movement therewith and coacting with said first manually operable means for preventing the latter from assuming a position which stops the operation of said first drive means and for releasing said first manually operable means for movement to said position which stops the operation of said first drive means when said fading means has approached the end of said given operation by a predetermined increment so that after said first drive means has stopped operating, said fading means will continue to operate until the end of the given operation where it is automatically stopped by said second manually operable means, and reversing means operatively connected to said first drive means for reversing the latter so as to rewind film in the camera, said fading means actuating said reversing means to rewind film while said fading means continues to operate after said control means has released said first manually operable means to assume said position.

12. In a motion picture camera, in combination, first drive means for driving the camera during normal operation thereof; fading means for effecting a plurality of fading operations; second drive means independent of said first drive means and operatively connected to said fading means for driving the latter; manually operable means operatively connected to said fading means for releasing the latter to said second drive means to be driven thereby and for automatically terminating the operation of said fading means by said second drive means when a given fading operation has been completed; reversing means operatively connected to said first drive means for reversing the latter so as to rewind film in the camera, said fading means actuating said reversing means while carrying out said given fading operation; and light-blocking means actuated by said fading means during reversal of said first drive means for preventing light from reaching the film during rewinding thereof.

13. In a motion picture camera, in combination, first drive means for driving the camera during normal operation thereof; fading means for effecting a plurality of fading operations; second drive means independent of said first drive means and operatively connected to said fading means for driving the latter; manually operable means operatively connected to said fading means for releasing the latter to said second drive means to be driven thereby and for automatically terminating the operation of said fading means by said second drive means when a given fading operation has been completed; reversing means operatively connected to said first drive means for reversing the latter so as to rewind film in the camera, said fading means actuating said reversing means while carrying out said given fading operation; diaphragm-control means for automatically setting the diaphragm of the camera according to the lighting conditions; and light-blocking means actuated by said fading means when the latter actuates said reversing means for rewinding film in the camera, said light-blocking means preventing light from reaching the film during rewinding thereof, and said light-blocking means being operatively connected to said diaphragm-control means for automatically actuating the latter to close the diaphragm of the camera during rewinding of the film.

14. In a camera as recited in claim 13, said first drive means including an electric motor and said reversing means including a switch actuated by said fading means to reverse the direction of rotation of said motor for rewinding film, said diaphragm-control means including a photosensitive resistor and said light-blocking means including a switch connected in parallel with said resistor and closed by said fading means simultaneously with the closing of said switch for reversing said motor so that said resistor is short-circuited during rewinding of the film.

15. In a motion picture camera, in combination, first drive means for driving the camera during normal operation thereof; fading means for effecting a plurality of fading operations; second drive means independent of said first drive means and operatively connected to said fading means for driving the latter; selecting means for selecting one of a plurality of different transporting speeds at which said first drive means will transport film in the camera; and lock means coacting with said fading means and said selecting means for maintaining the latter stationary during operation of said fading means, so that the speed of transportation of the film cannot be changed while said fading means effects one of said plurality of fading operations.

16. In a motion picture camera, in combination, first drive means for driving the camera during normal operation thereof; fading means for effecting a plurality of fading operations; second drive means independent of said first drive means and operatively connected to said fading means for driving the latter; selecting means for selecting one of a plurality of different transporting speeds at which said first drive means will transport film in the camera; and lock means coacting with said fading means and said selecting means for maintaining the latter stationary during operation of said fading means, so that the speed of transportation of the film cannot be changed while said fading means effects one of said plurality of fading operations, said lock means including a rotary toothed member forming part of said selecting means, an elongated shiftable bar having a toothed end directed toward said toothed member, and a cam operatively connected to said fading means and shifting said bar to an extent sufficient to place said toothed end thereof in engagement with said toothed member when said fading means operates, said engagement between said bar and toothed member preventing turning of the latter.

17. In a motion picture camera, in combination, first drive means for driving the camera during normal operation thereof; fading means for effecting a plurality of fading operations, said fading means including a turnable plate; second drive means independent of said first drive means and operatively connected to said fading means for driving the latter; selecting means for selecting one of a plurality of transporting speeds at which film in the camera will be transported by said first drive means, said selecting means including a manually turnable member; a cam connected to said manually turnable member for turnable movement therewith; an elongated pin extending between said cam and said plate normal to the latter; and a spring urging said pin in engagement with said cam, said cam displacing said pin beyond an edge of said plate at certain selected positions of said selecting means to prevent turning of said plate and operation of said fading means at any of said selected positions and said plate preventing movement of said pin and turning of said cam during operation of said fading means.

18. In a motion picture camera, in combination, first drive means for driving the camera during normal operation thereof; fading means for effecting a plurality of fading operations, said fading means including a rotary cam which turns during operation of said fading means, a fading filter, and a carrier carrying said filter and engaging said cam to be moved by the latter for moving said filter across the optical axis to effect said fading operations; second drive means independent of said first drive means and operatively connected to said fading means for driving the latter; and manually operable means operatively connected to said carrier for moving the latter independently of said cam for manually carrying out fading operations independently of said second drive means.

19. In a camera as recited in claim 18, said fading filter being a gray-wedge filter and at least one additional filter carried by said carrier and capable of being placed by said manually operable means in an operative position wherein said additional filter is intersected by the optical axis.

20. In a motion picture camera, in combination, first drive means for driving the camera during normal operation thereof; fading means for effecting a plurality of fading operations, said fading means including a rotary cam which turns during operation of said fading means, a fading filter, and a carrier carrying said filter and engaging said cam to be moved by the latter for moving said filter across the optical axis to effect said fading operations; second drive means independent of said first drive means and operatively connected to said fading means for driving the latter; and manually operable means coacting with said carrier for displacing the latter away from said cam to terminate the fading operation at the will of the operator.

21. In a motion picture camera, in combination, first drive means for driving the camera during normal operation thereof; fading means for effecting a plurality of fading operations, said fading means including a rotary cam which turns during operation of said fading means, a fading filter, and a carrier carrying said filter and engaging said cam to be moved by the latter for moving said filter across the optical axis to effect said fading operations; second drive means independent of said first drive means and operatively connected to said fading means for driving the latter; manually operable means coacting with said carrier for displacing the latter away from said cam to terminate the fading operation at the will of the operator; and spring means yieldably maintaining said carrier in the same plane as said cam, said manually operable means displacing said carrier in opposition to spring means away from said cam in a direction perpendicular to the plane thereof.

22. In a motion picture camera, in combination, first drive means for driving the camera during normal operation thereof; fading means for effecting a plurality of fading operations, said fading means including a rotary cam which turns during operation of said fading means, a fading filter, and a carrier carrying said filter and engaging said cam to be moved by the latter for moving said filter across the optical axis to effect said fading operations; second drive means independent of said first drive means and operatively connected to said fading means for driving the latter; manually operable means operatively connected to said carrier for moving the latter independently of said cam for manually carrying out fading operations independently of said second drive means; spring means urging said carrier toward the center of said cam into engagement therewith; additional manually operable means coacting with said carrier for shifting the latter substantially parallel to the axis of said cam out of engagement therewith so that said spring means will then shift said carrier toward said axis alongside said cam; and stop means limiting the movement of said carrier toward said axis by said spring means.

23. In a motion picture camera, in combination, first drive means for driving the camera during normal operation therewith; fading means for effecting a plurality of fading operations, said fading means including a rotary cam which turns during operation of said fading means, a carrier engaging said cam to be shifted thereby during operation of said fading means, a spring operatively connected to said carrier for urging the latter toward the axis of said cam into engagement therewith, and a fading filter carried by said carrier to move across the optical axis to effect said fading operations; second drive means independent of said first drive means and operatively connected to said fading means for driving the latter; a projection carried by said carrier; an elongated pin; and manually operable selecting means for selecting one of a plurality of fading operations, said selecting means when placed in one of its positions placing said pin in the path of movement of said projection for engaging the latter and displacing the carrier from said cam so that the spring will then advance said carrier alongside said cam toward the axis thereof to terminate the fading operation upon engagement of said pin and projection.

24. In a motion picture camera, in combination, first drive means for driving the camera during normal operation therewith; fading means for effecting a plurality of fading operations, said fading means including a rotary cam which turns during operation of said fading means, a carrier engaging said cam to be shifted thereby during operation of said fading means, a spring operatively connected to said carrier for urging the latter toward the axis of said cam into engagement therewith, and a fading filter carried by said carrier to move across the optical axis to effect said fading operations; second drive means independent of said first drive means and operatively connected to said fading means for driving the latter; a projection carried by said carrier; an elongated pin; and manually operable selecting means for selecting one of a plurality of fading operations, said selecting means when placed in one of its positions placing said pin in the path of movement of said projection for engaging the latter and displacing the carrier from said cam so that the spring will then advance said carrier alongside said cam toward the axis thereof to terminate the fading operation upon engagement of said pin and projection, said manually operable selecting means having a fade-out position in which said pin is in the path of movement of said projection as well as a fade-in position in which said pin is displaced from the path of movement of said projection.

25. In a camera as recited in claim 24, said first drive means including an electric motor and an electric circuit connected thereto and including a switch; said manually operable selecting means including a cam engaging said switch for controlling the latter according to the position of said manually operable selecting means.

References Cited by the Examiner

UNITED STATES PATENTS

| 1,275,863 | 8/1918  | Davis      | 352—91 |
|-----------|---------|------------|--------|
| 2,305,664 | 12/1942 | Bogopolsky | 352—91 |
| 2,307,297 | 1/1943  | Phillimore | 352—91 |
| 2,319,204 | 5/1943  | Bolsey     | 352—91 |

NORTON ANSHER, *Primary Examiner.*

WILLIAM MISIEK, *Examiner.*